Figure 3:
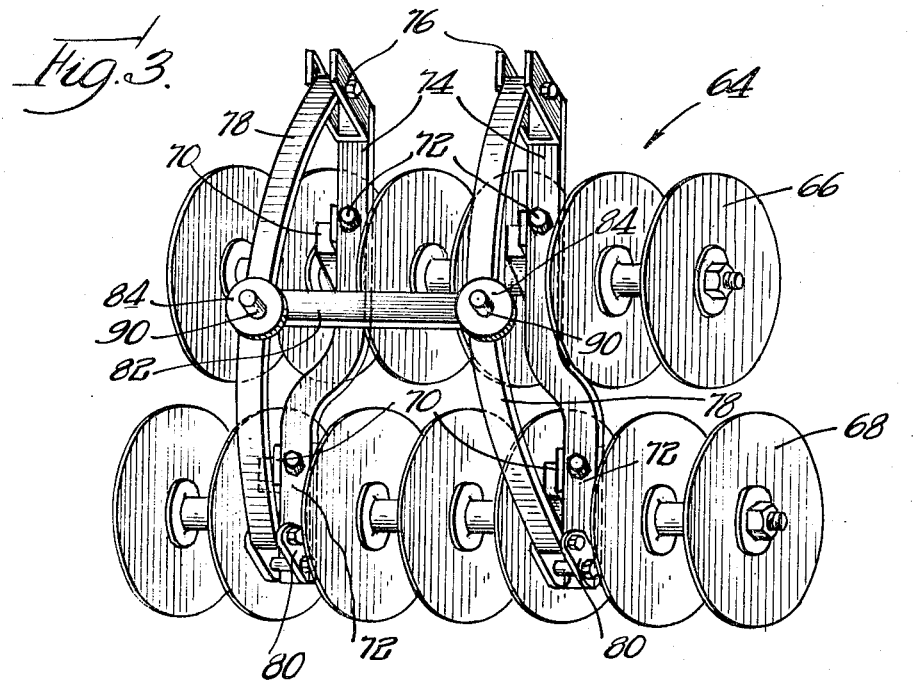

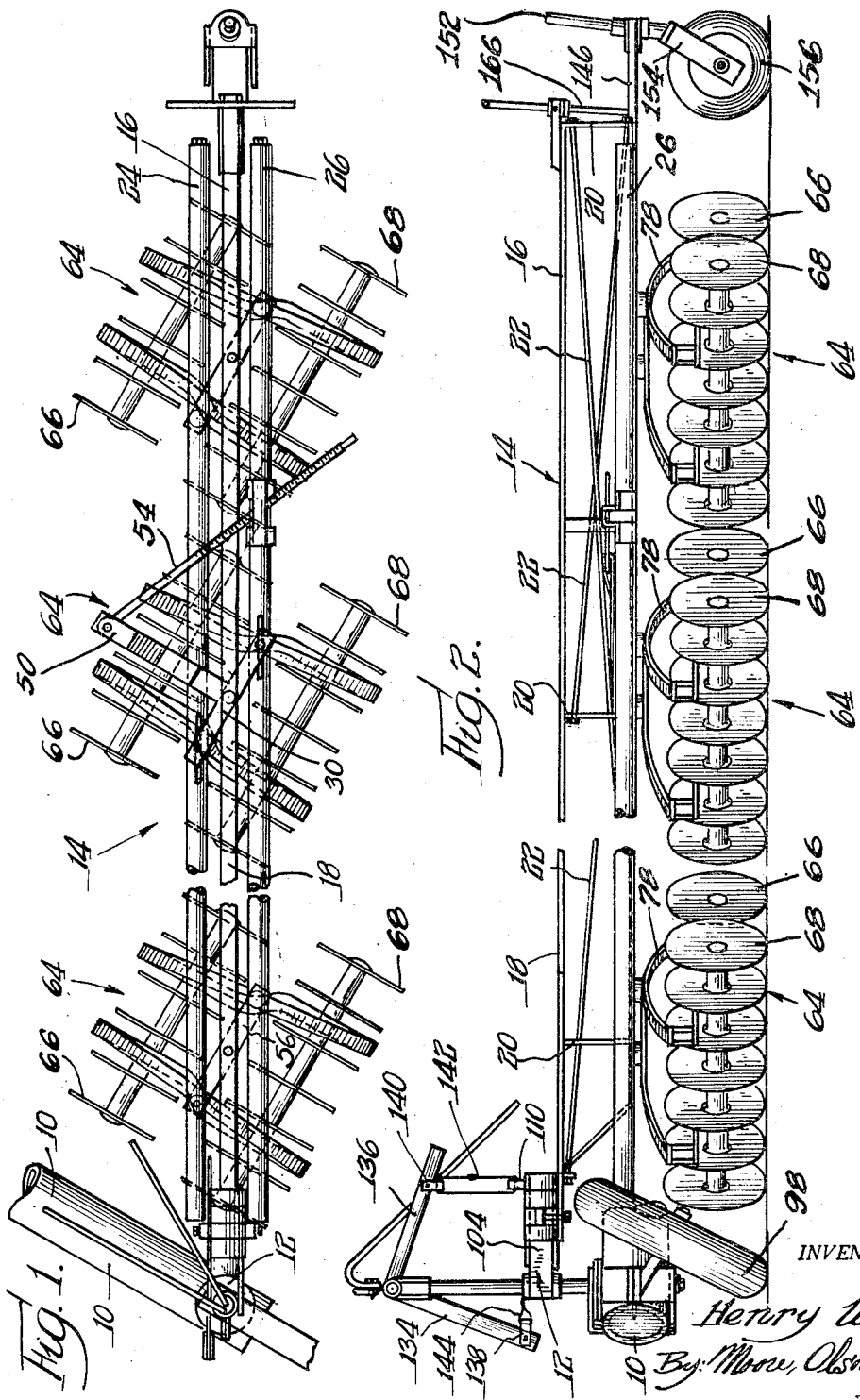

June 14, 1955

H. WELLSCH 2,710,570

SOIL PACKING AND FRAME STABILIZING
ATTACHMENT FOR DISC TILLERS

Filed Oct. 29, 1949

3 Sheets—Sheet 2

INVENTOR.
BY: Henry Wellsch
Moore, Olson & Trexler
Attys.

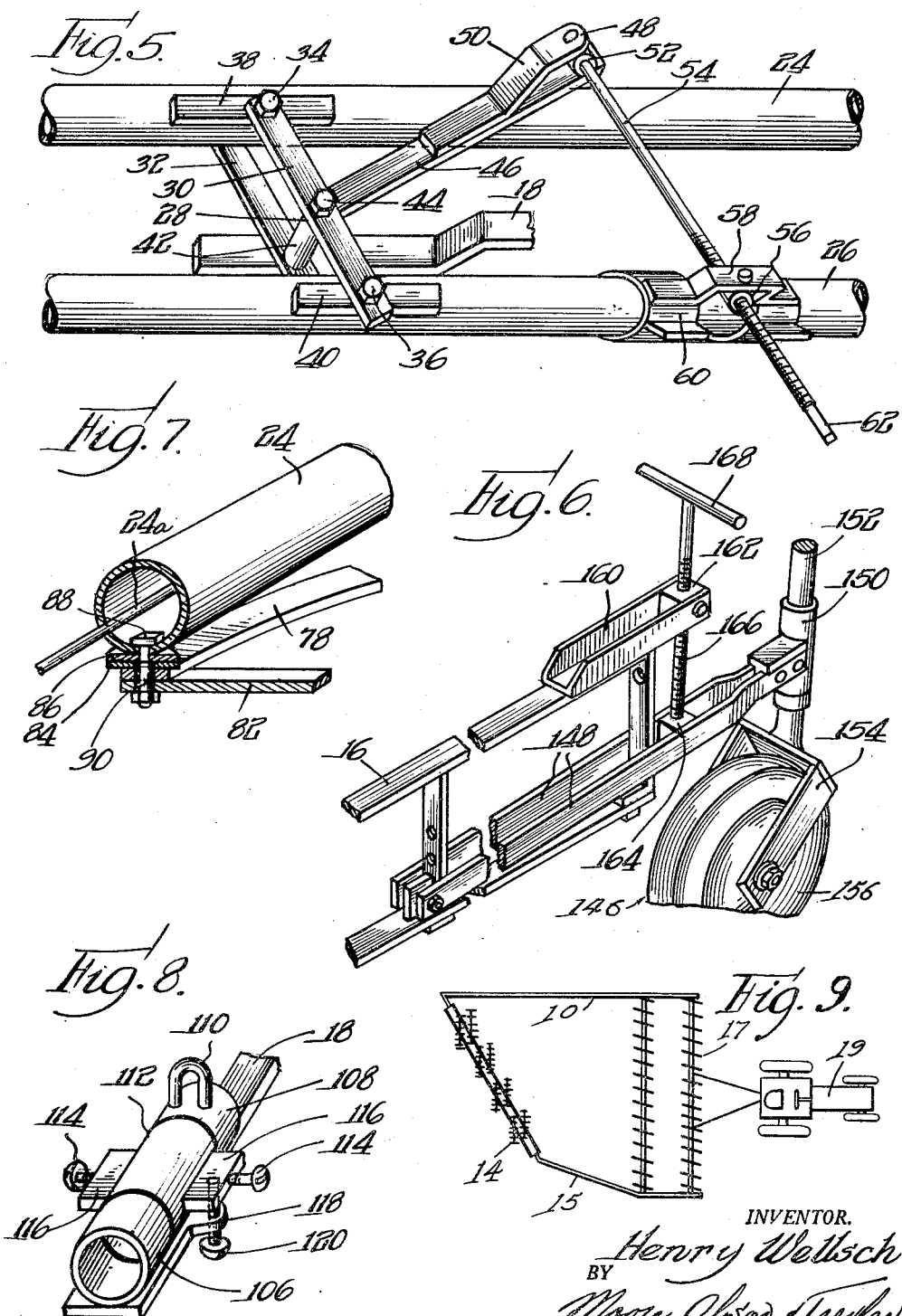

United States Patent Office 2,710,570
Patented June 14, 1955

2,710,570

SOIL PACKING AND FRAME STABILIZING ATTACHMENT FOR DISC TILLERS

Henry Wellsch, Swift Current, Saskatchewan, Canada

Application October 29, 1949, Serial No. 124,303

13 Claims. (Cl. 97—54)

This invention relates to a farm implement to be affixed to and drawn behind a disc tiller to pack the soil and to insure operation of the tiller in a straight line.

Disc tillers are in common use to till large areas of soil. Such tillers generally comprise a considerable number of flat or dished discs or plates rotatably carried at an angle to the earth by some suitable framework. The tiller is generally pulled by a tractor or other prime mover with the discs mounted at an angle to the direction of motion of the tractor. This engenders a considerable tendency for the disc tiller to move sideways as well as forward so that the pulling force from the tractor is not parallel to the direction of motion of the tractor. If the soil is of uniform consistency, the tiller will move in a satisfactorily straight line in the same direction as the tractor. Generally, however, the firmness of the soil varies considerably with the type of soil, with the moisture content of the soil and with the degree of packing of the soil. Such variation causes the transverse thrust on the disc tiller to vary considerably, and this in turn causes the tiller to move in an unpredictable, wavy path rather than a desirable, straight one. Buried rocks are frequently encountered and these tend to cause an even greater deviation from the desired straightforward course.

I have found that straight line motion of a disc tiller can be assured by towing my apparatus behind the tiller. My apparatus comprises essentially a plurality of discs which are mounted for movement in essentially the same direction as the movement of the tractor, contrary to the usual practice of tilling, and novel supporting structure for the discs. In addition to insuring straightforward operation of a disc tiller, my apparatus breaks up the large lumps of earth frequently left by a disc tiller and smooths and packs the earth to aid in the prevention of soil drifting and in the conservation of moisture.

An object of my invention is to provide means insuring the linear operation of a disc tiller in the same direction as the tractor or other prime mover.

A further object of my invention is the provision of apparatus for automatically rendering the means as outlined in the foregoing paragraph inoperative when it is desired to turn a corner.

A more specific object of my invention is the provision of a plurality of discs and suitable supporting structure which are towable behind a tractor and disc tiller with the discs oriented in the direction of movement of the tractor to prevent non-linear motion of the tiller and to concurrently pack the tilled soil.

A further object of the present invention is the provision of means for adjusting the discs as outlined in the preceding paragraph so that they will lie in the direction of motion of the tractor.

Figure 4:
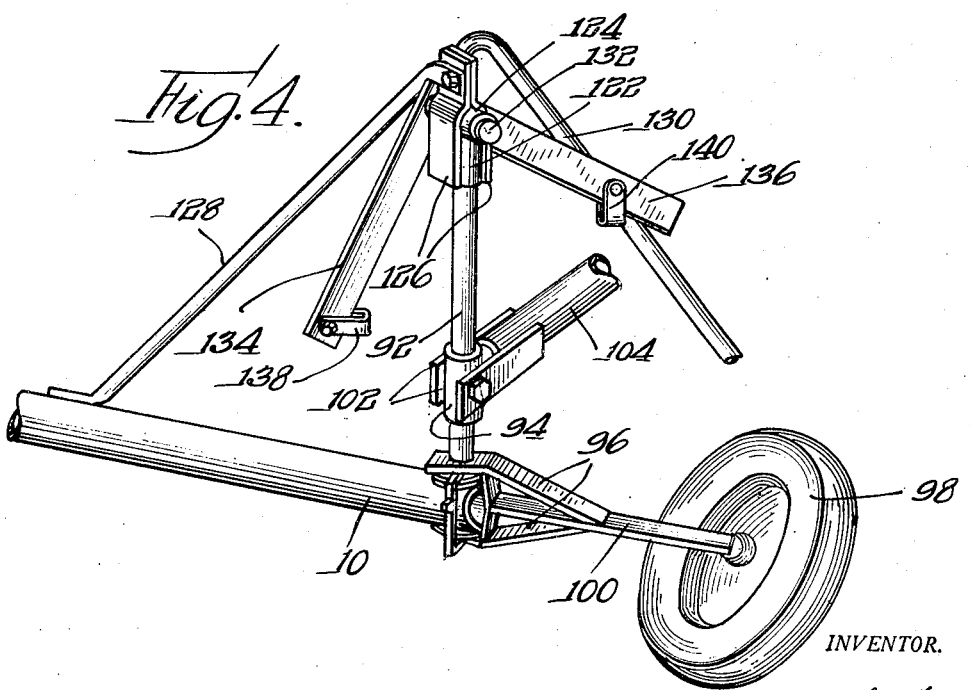

Other and further objects and advantages of the present invention will be apparent from the following description of an illustrative embodiment when taken in conjunction with the accompanying drawings in which:

Fig. 1 is a top plan view of my disc packer;
Fig. 2 is a rear view of the same;
Fig. 3 is a perspective view of one unit of discs;
Fig. 4 is a perspective view of the assembly which secures my disc packer to a tiller and lifts the disc packer from the ground upon turning;
Fig. 5 is a perspective view of the disc orienting mechanism;
Fig. 6 is a perspective view of a transport assembly incorporated in my invention;
Fig. 7 is a perspective, sectional view of a pivotal connection between a unit of discs and the supporting frame;
Fig. 8 is a perspective view showing the connection between a conventional disc tiller and my disc packer, and
Fig. 9 is a somewhat schematic plan view showing the arrangement of my device with a tractor and a conventional disc tiller.

Referring first to Figs. 1 and 2, my apparatus is shown as secured to an extending frame member 10, which may be an integral portion of the frame of a conventional disc tiller or may be an extension thereof. A pivotal connection 12, which will be described later in considerable detail, secures my packer, which is generally designated by the number 14 to the frame member 10 at one end, and the other end may be secured by any suitable guy wire 15 to the disc tiller 17 (Fig. 9) drawn behind a tractor 19. My packer comprises a frame 16 which may be conveniently made of welded strap steel including transverse horizontal members 18 and vertical spacers 20. Adjustable tension rods 22 are also preferably provided for diagonal bracing of the frame.

To the frame 16 are secured a pair of transverse supports 24 and 26 by means illustrated in Fig. 5. In Fig. 5, a portion of the lower horizontal frame member 18 as well as portions of the transverse supports 24 and 26 are shown connected by a pivotal T-joint generally designated by the numeral 28. Specifically, the T-joint includes upper and lower cross members 30 and 32, respectively, pivoted adjacent each end as at 34 and 36 to the transverse supports 24 and 26. Blocks 38 and 40, which are secured to the transverse supports 24, 26 by any suitable means such as welding, space the upper cross member 30 a slight distance above the transverse supports 24, 26. The cross members 30, 32 are spaced at their centers by a bushing 42 and are pivotally connected as by a bolt 44 to the lower horizontal frame member 18. The stem 46 of the T-joint is welded or otherwise rigidly secured to the upper cross member 30 and extends horizontally therefrom at a level above that of the supports 24 and 26 due to the blocks 38, 40. A bifurcated holding bracket 48 is provided at the free end of the T stem by welding or otherwise securing a piece of steel strap 50 to the stem 46. A swivel block 52 is mounted within the bifurcated bracket 48 and rotatably secures one end of a screw 54. The screw threadedly engages a swivel nut 56 carried by a bracket 58 secured to collars 60 clamped on the support 26. The free end 62 of the screw is provided with a square or other non-circular shape to allow the screw to be readily turned by a hand crank. It may be seen that as the screw is advanced in either direction that it will cause the T-joint to pivot about the bolt 44 and move the supports 24 and 26 relatively both longitudinally and transversely to rotate the packer units described in the following paragraph to their proper operating position.

Referring again generally to Figs. 1 and 2 and more specifically to Fig. 3, a plurality of packer units, generally designated by the numeral 64, are carried beneath the frame 16. These packer units may be of any desirable number to conform with the width of tiller being used, and I have shown the structure as broken off in the drawings to so indicate. The packer units comprise generally a forward section of discs 66 and a rear section of discs 68 mounted on parallel axles and having their planes perpendicular to the ground. The axles are carried by bearings 70 suitably secured as by bolts 72 to packer frame members 74. The packer frame members 74 are preferably bent in their wide transverse dimension as shown so that a larger number of discs may be carried by the rear axle in order to have the rows of discs offset slightly and still preserve a symmetrical structure. Brackets 76 which are welded or otherwise suitably secured to the packer frame members 74 pivotally secure the front ends of leaf springs 78. The rear ends of the springs 78 are secured by shackles 80 to the rear ends of the packer frame members 74. A spacer 82 is connected between the springs 78, preferably between their mid points. Discs 84 are welded to the top of the springs above the spacer 82 to form pivotal bearings. The upper half of each bearing, as seen in Fig. 7, comprises a similar disc 86 welded to one of the transverse supports 24 or 26. In this figure the support 24 is shown and is shown as being reinforced by a steel bar 24a secured within its outer tubular body. The discs 84, 86, as well as the structures to which they are welded, are secured together by a nut and bolt 88. A bushing 90 is provided which abuts against the nut and against the upper disc 86 while fitting through the lower disc 84, spring 78 and spacer 82 to prevent binding when the nut is tightened on the bolt. Although not shown, the central portion of the spacer 82 may also be pivoted to the lower horizontal frame member 18 to insure uniform spacing of the transverse supports 24, 26.

As my apparatus is designed to insure linear movement of the tiller to which it is connected, it is apparent that it would be very difficult to turn a corner with my apparatus in operative position. Therefore, in the structure for attaching my apparatus to a conventional disc tiller, I have provided means for automatically rendering the apparatus inoperative in response to a turning movement of the tractor or prime mover. Such means is best shown in Figs. 2 and 4. The member 10, as previously identified, is either an extension of or is a portion of the frame of a disc tiller. An upstanding rod 92 is mounted at the extremity of the frame member 10, with a bushing 94 encircling it. Over the rod 92 is pivotally secured a bracket 96 which carries a wheel 98 by means of a spring bar 100 for pivotal movement behind the frame member 10. The bushing 94 pivotally carries a bracket 102 which is welded or otherwise suitably secured to a short cylindrical tube 104. The frame 16 of the disc packer is secured to this tube as seen in Fig. 2 by means shown in detail in Fig. 5. A pair of spaced collars 106 and 108 are welded or otherwise suitably secured to the upper surface of the top horizontal frame member 18. A U-shaped support member 110 is secured to the collar 108 and its utility will be disclosed at an ensuing point. The tube 104 fits through the collars 106, 108 and also through a sleeve 112 placed between the collars. The sleeve is fixed to the tube as by setscrews 114 and is provided with laterally extending ears 116. Disposed beneath the ears 116 are lugs 118 integral with the frame member 18. Adjusting screws 120 extend upwardly through the lugs 118 to limit the relative pivotal movement of the frame member 18 and the tube 104 to which the sleeve 112 is fixed. The pivotal movement is allowed to insure proper operation when passing over uneven ground.

A sleeve 122 fits atop the rod 92, and to it are welded or otherwise suitably secured a tubular bearing 124 and a bracket 126. A bracing rod 128 extends between the bracket 126 and the disc tiller frame member 10, and another bracing rod 130 extends from the bracket 126 to any convenient point on the disc tiller. A short shaft 132 fits within the tubular bearing 124 and has lifting arms 134 and 136 welded or otherwise rigidly affixed to one end. Clevises 138 and 140 are secured adjacent the ends of the lifting arms 134 and 136, respectively. The shaft 132 may be precluded from axial movement in the bearing 124 by any conventional means such as a collar affixed to its free end. As may be seen in Fig. 2, the clevis 140 is secured to the U-shaped lifting member 110 by means such as a loop of wire 142, while the clevis 138 is provided with a wire or cable 144 which leads through suitable pulleys or directly to a lever attached to the top of the shaft carrying a turnable front wheel, not shown, of the disc tiller and turnable therewith. When the wheel turns in either direction, the lever pulls on the cable 144 to pull the lifting arm 134 down and consequently raise the lifting arm 136. The lifting arm 136, by means of the clevis 140, wire 142 and lifting member 110, raises the entire disc packer as the bushing 94 slides up the rod 92 and the wheel supports the weight of the disc packer. The wheel 98 is rotatable with respect to the frame member 10 in a substantially vertical plane, and the disc tiller and my disc packer thus readily negotiate any turns.

At the extreme right end of Fig. 2, I have shown a transport assembly 146 which is disclosed in detail in Fig. 6. The transport assembly comprises a bracket 148 pivotally secured to the frame 16 of my disc packer. The bracket carries at its outer end a bearing member 150 within which is pivotally secured a substantially vertical shaft 152 carrying a wheel bracket 154 and transport wheel 156. A bracket 160 is secured to the top of the frame 16 and extending slightly beyond the end thereof, and secures a threaded swivel block 162. A second swivel block 164 is secured to the pivotal bracket 148. An adjusting screw 166 threadedly engages the upper swivel block 162 and is secured within the lower swivel block 164 against axial movement. A cross arm 168 is secured to the upper end of the adjusting screw 166 in order that the latter may be readily turned. By means of this structure, the transport wheel 156 is normally kept out of contact with the ground so that the entire weight is supported by the discs 66, 68 in order to best pack the soil and insure linear movement of the disc tiller. In many instances, however, it is desirable to transport my disc packer without having the discs in contact with the earth or highway, and this is readily accomplished by rotating the adjusting screw 166 to lower the wheel 156 relative to the frame and consequently lift the frame and discs upward so that the discs do not contact the ground.

It is apparent that I have herein presented an apparatus which may be attached to any conventional disc tiller to insure movement of the tiller in a straight line behind a tractor or other prime mover and which additionally packs the soil and breaks up large lumps to prevent evaporation of moisture from the soil. The apparatus is automatically lifted from the ground when a turn is made so that the disc tiller may readily follow the path of the tractor.

Although I have shown and described a preferred embodiment of this invention, it is to be understood that this is for illustrative purposes only and that my invention is to be limited only by the spirit and scope of the appended claims.

I claim:

1. A farm implement for packing soil and insuring linear movement of a disc tiller comprising frame means, means for securing said frame means to a conventional disc tiller at an oblique angle to the direction of motion of said tiller for movement therewith, a plurality of groups of substantially flat discs, all of the discs in any one group being substantially parallel, means for mounting said groups of discs on said frame means and in contact with the ground, and means for pivoting said groups of discs relative to said frame means to orient said discs in planes parallel to the direction of motion of said disc tiller and oblique relative to said frame.

2. A farm implement as defined in claim 1 in which each group of discs comprises front and rear rows of discs, and means for supporting said front and rear rows displaced axially and radially relative to one another.

3. A farm implement for packing soil and insuring linear movement of a disc tiller comprising frame means, means for securing said frame means to a conventional disc tiller for movement therewith, a plurality of groups of substantially flat discs, all of the discs in any group being parallel, means for pivotally securing said groups of discs to said frame means and in contact with the ground, a pair of transverse supports in addition to said frame means pivotally secured to said groups of discs, and means for oppositely shifting said transverse supports relatively transversely and longitudinally stably to rotate said groups of discs relative to said frame.

4. A farm implement for packing soil and insuring linear movement of a disc tiller comprising frame means, means for securing said frame means to a conventional disc tiller for movement therewith, a plurality of substantially flat discs, mounting means carrying said discs and pivotally carried by said frame means for normally supporting said disks in contact with the ground, means interconnecting said mounting means and said frame means for pivoting said mounting means and said discs relative to said frame means, a wheel at one end of said frame means, and means interconnecting said wheel and said one end of said frame means and operable from a point remote relative to said frame means for lifting said frame means to remove said discs from contact with the ground in which position said frame means is supported by said wheel.

5. A farm implement for packing soil and insuring linear movement of a disc tiller comprising frame means, means for securing said frame means to a conventional disc tiller for movement therewith, a wheel carried by said securing means, a plurality of substantially flat discs, means for mounting said discs on said frame means, said discs normally resting on the ground, and means interconnecting said wheel, said securing means, and said frame means and controllable from a point remote from said securing means for lifting said frame means relative to said wheel to raise said discs out of contact with the ground.

6. A farm implement for packing soil and insuring linear movement of a disc tiller comprising frame means, a plurality of substantially flat discs carried by said frame means and normally in contact with the ground, a wheel at one end of said frame means, means for securing said frame means to a conventional disc tiller for movement therewith, said securing means including a support substantially upstanding from said wheel, means for pivotally securing said frame means about said upstanding support, said pivotal means being longitudinally slidable upon said upstanding support, elevator mechanism interconnecting said pivotal means and said upstanding support, an elongated tensionable member secured to said elevator mechanism for operating said elevator mechanism to slide said pivotal connection up said upstanding support means in response to tension applied to said elongated means to raise said discs from contact with the ground.

7. A farm implement as defined in claim 6 in which the elevator mechanism includes lever means pivoted adjacent the top of said upstanding support, said lever means being secured to said elongated tensionable means, and means connecting said lever means to said frame means whereby tension applied to said elongated means will actuate said lever means to raise said discs from contact with the ground.

8. A farm implement for packing soil and insuring linear movement of a disk tiller, comprising frame means, means for securing said frame means to a conventional disk tiller for movement therewith, a plurality of substantially flat disks, mounting means for pivotally mounting said disks to said frame means and for normally supporting said disks in contact with the ground, means interconnecting said mounting means and said frame means for pivoting said mounting means and said disks relative to said frame means, a wheel interconnected with said frame means adjacent one end thereof and pivotally mounted for turning relative to said frame means, means interconnecting said wheel and said frame means for lifting said frame means relative to said wheel to remove said disks from contact with the ground, and means for operating said interconnecting means from a remote location relative thereto.

9. A farm implement for packing soil and insuring linear movement of a disk tiller, comprising frame means, means for connecting said frame means to a conventional disk tiller for movement therewith, a plurality of substantially flat disks, means for pivotally mounting said disks on said frame means for normal contact with the ground, a wheel disposed adjacent one end of said frame means, mounting means for interconnecting said wheel with said frame means, said mounting means being slidably connected with said frame means to permit generally vertical relative movement between said mounting means and said frame means, and means for moving said mounting means and said wheel generally vertically relative to said frame means for raising said frame means and said disks relative to the ground.

10. A farm implement as set forth in claim 9 wherein the means for moving the mounting means and wheel relative to the frame means includes means operable from a location remote thereto.

11. A farm implement as set forth in claim 10 wherein the remote operating means comprises a pivotally mounted lever and an elongated tensionable member for pivoting said lever.

12. A farm implement for packing soil and insuring linear movement of a disc tiller, comprising frame means, means for securing said frame means to a conventional disc tiller for movement therewith, a plurality of groups of substantially flat discs, all of the discs in any group being parallel, means for pivotally securing said groups of discs to said frame means and in contact with the ground, a plurality of transverse supports in addition to said frame means pivotally secured to said groups of discs, a lever member pivotally connected adjacent each of its ends to the transverse supports and pivoted intermediate said ends to the frame means, and means for pivoting said lever member about the pivotal connection to said frame means to move said transverse supports relatively closer or farther apart for shifting said transverse supports relatively transversely and longitudinally to rotate said groups of discs relative to said frame.

13. A farm implement for packing soil and insuring linear movement of a disc tiller comprising frame means, a plurality of substantially flat discs carried by said frame means, and means for securing said frame means to a conventional disc tiller, said securing means including means allowing said frame means to pivot about said securing means substantially in a plane parallel to the ground and means allowing limited pivotal movement of said frame means about said securing means on an axis substantially parallel to the ground, said last named means comprising a shaft substantially parallel to the ground and mounted on the securing means allowing pivoting substantially parallel to the ground, a sleeve rotatably mounted on said shaft and fixed to said frame means, and means for adjusting the limits of movement of said sleeve comprising abutting stops carried by said shaft and by said frame means and means for adjusting at least one of said stops.

References Cited in the file of this patent

UNITED STATES PATENTS

| 525,368 | Tallman | Sept. 4, 1894 |
| 800,974 | Bollinger | Oct. 3, 1905 |
| 1,035,126 | Weiler | Aug. 6, 1912 |
| 1,505,588 | Crosby | Aug. 19, 1924 |
| 1,873,359 | Stuck | Aug. 23, 1932 |

FOREIGN PATENTS

| 14,444 | Australia | Aug. 23, 1934 |
| 22,199 | Australia | May 11, 1936 |